US008798957B2

(12) United States Patent
Feiten et al.

(10) Patent No.: US 8,798,957 B2
(45) Date of Patent: Aug. 5, 2014

(54) METHOD FOR THE COMPUTER-AIDED CALCULATION OF THE MOVEMENT OF AN OBJECT USING SENSOR DATA

(75) Inventors: Wendelin Feiten, Neubiberg (DE); Michael Fiegert, München (DE)

(73) Assignee: Siemens Aktiengesellschaft, Munich (DE)

( * ) Notice: Subject to any disclaimer, the term of this patent is extended or adjusted under 35 U.S.C. 154(b) by 432 days.

(21) Appl. No.: 12/866,755

(22) PCT Filed: Feb. 6, 2009

(86) PCT No.: PCT/EP2009/051360
§ 371 (c)(1),
(2), (4) Date: Aug. 9, 2010

(87) PCT Pub. No.: WO2009/101030
PCT Pub. Date: Aug. 20, 2009

(65) Prior Publication Data
US 2010/0318320 A1 Dec. 16, 2010

(30) Foreign Application Priority Data
Feb. 11, 2008 (DE) .......................... 10 2008 008 499

(51) Int. Cl.
*G01S 17/89* (2006.01)
*G01S 5/16* (2006.01)
*G01S 7/48* (2006.01)
(52) U.S. Cl.
CPC . *G01S 5/16* (2013.01); *G01S 7/4802* (2013.01)
USPC ........................ 702/150; 701/523; 340/995.24
(58) Field of Classification Search
CPC ................. G01S 17/89; G01S 17/936
USPC ...................... 702/150; 701/523; 340/995.24
See application file for complete search history.

(56) References Cited

U.S. PATENT DOCUMENTS

| 4,177,463 A | 12/1979 | Andermo |
| 2005/0047661 A1* | 3/2005 | Maurer .......................... 382/190 |

(Continued)

FOREIGN PATENT DOCUMENTS

| DE | 102 52 323 A1 | 5/2004 |
| GB | 1 478 835 A | 7/1977 |
| JP | 2007042095 A | 2/2007 |

OTHER PUBLICATIONS

Vandorpe et al., "Exact Dynamic Map Building for a Mobile Robot using Geometrical Primitives Produced by a 2D Range Finder", Apr. 1996, Proceedings of the IEEE Intl. Conf. on Robotics and Automation, pp. 901-908.*

(Continued)

*Primary Examiner* — Jonathan C Teixeira Moffat
*Assistant Examiner* — Regis Betsch (57) ABSTRACT

A method for the computer-aided calculation of the movement of an object using sensor data from a sensor arranged on the object is provided. The sensor data comprise measuring point set measured at different time points, and the movement of the object is determined between different measuring point sets. From the measuring point sets, initially structural information is extracted and stored together with the measuring points that are not to be associated with any structural type. Subsequently, associations between the structural elements with the same structure type are determined and a corresponding transformation for representing the structural elements is performed. An association of the unassignable measuring points and the structural elements is created and a corresponding transformation of the superimposed associated measuring points and structural elements is performed. The structural elements or measuring points are associated preferably by a statistic method taking into account a measuring noise of the sensor.

19 Claims, 4 Drawing Sheets

(56) References Cited

U.S. PATENT DOCUMENTS

2007/0026872 A1* 2/2007 Fiegert et al. .............. 455/456.1
2008/0188242 A1* 8/2008 Carlson et al. .............. 455/456.5
2010/0164701 A1* 7/2010 Bargman et al. .............. 340/436

OTHER PUBLICATIONS

Jens-Steffen Gutmann, "Robuste Navigation autonomer mo-biler Systeme", Dissertation, 2000, Albrecht-Ludwig-Universität Freiburg; Others.

Michael Bosse, "Atlas: A Framework for Large Scale Auto-mated Mapping and Localization", Dissertation Massachusetts Institute of Technology, pp. 57-62, Feb. 2004; Others.

Skrzypczynski P., "Spatial Uncertainty Management for Simultaneous Localization and Mapping", Robotics and Automation, 2007 IEEE International Conference, pp. 4050-4055, 10-14.Apr. 2007; Others.

Yaqub T Et al.: "Line Segment Based Scan Matching for Concurrent Mapping and Localization of a Mobile Robot", Control, Automation, Robotics and Vision, Conference on, IEEE, PI, Dec. 5, 2006, pp. 1-6, XP031333940, ISBN: 978-1-4244-0341-7, p. 1-3; Others.

Biber et al., "The Normal Distributions Transform: a New Approach to Laser Scan Matching", Proceedings of the 2003 IEEE/RSJ International Conference on Intelligent Robots and Ssystems. (IROS 2003). Las Vegas, NV, Oct. 27-31, 2003; [IEEE/RSJ International Conference on Intelligent Robots and Systems], New York, NY: IEEE, US, vol. 3, Oct. 27, 2003, pp. 2743-2748, XP:010675504, ISSBN: 978-0-7803-7860-5; Others.

Jiang X et al: "Edge Detection in Range Images Based on Scan Line Approximation" Computer Vision and Image Understanding, Academic Press, US, vol. 73, No. 2, Feb. 1, 1999, pp. 183-199, XP004444655, ISSN: 1077-3142, Absatz [0004], Abbildungen 3, 4; Others.

* cited by examiner

METHOD FOR THE COMPUTER-AIDED CALCULATION OF THE MOVEMENT OF AN OBJECT USING SENSOR DATA

CROSS REFERENCE TO RELATED APPLICATIONS

This application is the U.S. National Stage of International Application No. PCT/EP2009/051360 filed Feb. 6, 2009, and claims the benefit thereof. The International Application claims the benefits of German Application No. 10 2008 008 499.9 DE filed Feb. 11, 2008. All of the applications are incorporated by reference herein in their entirety.

FIELD OF INVENTION

The invention relates to a method for the computer-aided calculation of the movement of an object from sensor data as well as to a corresponding device and a corresponding computer program product.

BACKGROUND OF INVENTION

The invention relates to the technical field of determining the egomotion of mobile objects, such as e.g. vehicles, aircraft, robots and the like. In the case of the autonomous movement of such objects it is necessary to determine the position and orientation of the object in space, e.g. in a two-dimensional plane of movement. Measurement sensors disposed on the object, laser scanners for example, are used for the position determination. Said sensors detect the environment of the object and by this means generate a set of measurement points which result for example from the roundtrip time of laser beams of a laser scanner reflected by objects in the environment.

When laser scanners are used to determine position they are generally mounted in such a way that they allow a light beam to circulate parallel to the floor and measure the distance to the next reflecting point. In this way a sequence of two-dimensional measurement points in the coordinates of the autonomous object is obtained, said sequence also being referred to as a scan. In order to determine the egomotion of the object from said data it is known from the prior art to compare a scan performed at an earlier point in time with a current scan. In this case a search is conducted for a transformation which maps said two scans as accurately as possible onto one another.

In the prior art there are various standard methods for determining the egomotion of objects based on the comparison of sets of measurement points generated at different times. An overview of current methods can be found in publication [1].

The known methods can essentially be divided into two groups. The first group of methods extracts structural elements, in particular lines, from the measurement point sets and searches for a transformation which maps said structural elements as effectively as possible onto one another. The second group processes raw data in the form of the acquired measurement points. The first group operates precisely and reliably in structured environments, such as e.g. in interior spaces. The second group, in contrast, is suitable for universal use, though it is imprecise and more computationally intensive. Both method classes function poorly if the environment is only partially structured, for example if only a single wall can be extracted. In this case a method according to the first group cannot extract a displacement of the object parallel to the wall, whereas a method of the second group tends to rely on randomly, yet incorrectly assigned measurement point pairs of the measurement point sets that are compared with one another.

SUMMARY OF INVENTION

An object of the invention is to provide a method for the computer-aided calculation of the movement of an object from sensor data which easily and reliably determines the egomotion of the object.

This object is achieved by a method and a device as claimed in the independent claims. Developments of the invention are defined in the dependent claims.

In the method according to the invention, sensor data of a sensor disposed on an object is processed, the sensor data containing measurement point sets acquired at different point in time from measurement points in the environment of the object and the object movement between a first data set acquired at a first point in time and a second data set acquired at a second point in time being ascertained.

In the method according to the invention, in a first step a) structural elements of one or more structure types are extracted from the first measurement point set, a first data set being obtained as a result. Structural elements are extracted in an analogous manner from the second measurement point set, a second data set being obtained as a result. The first and second data sets in each case contain the extracted structural elements and unassignable measurement points which cannot be associated with any structural element.

In a step b) the structural elements of the same structure type of the second data set are then associated with the corresponding structural elements of the first data set. If associations are found, a transformation sequence (which where appropriate can include only a single transformation or, if no association is present, a null transformation without change of location) is performed based on the associations in order to map the structural elements of the second data set onto the structural elements of the first data set, a third data set being obtained as a result.

Next, in a step c), the structural elements of the third data set are associated with the unassignable measurement points of the first data set. If associations are found, a second transformation sequence (which where appropriate can include only a single transformation or, if no associations are present, a null transformation without change of location) is performed based on the associations in order to map the structural elements of the third data set onto the unassignable measurement points of the first data set, a fourth data set being obtained as a result.

Finally, the movement of the object between the first and second points in time is determined based on at least the first and second transformation sequence.

The method according to the invention is characterized in that in the method both structure information in the form of structural elements and unassignable measurement points are processed in a suitable manner. The method accordingly combines the advantages of the two methods of the first and second groups as described in the introduction, wherein initially a search is conducted for matches between extracted structural elements and subsequently the transformation resulting therefrom is refined by the comparison of unassignable measurement points with structural elements. In this way a method is created which, based on the comparison of two acquired measurement point sets, can determine the egomotion of an object easily and with few or no incorrect associations.

In a preferred embodiment variant of the method according to the invention the extracted structural elements are at least of the type line. Preferably the structural elements of the type line are extracted first in step b) of the method, its being possible to use for the extraction known methods as described, for example, in document [1].

In a preferred variant of the method according to the invention the extracted structural elements also include further structure types, in particular the structure type segment of a circle. A more precise association between structural elements and hence a more accurate mapping of the data sets onto one another is achieved through the use of further structure types.

In a preferred variant of the method according to the invention, connected components comprising succeeding measurement points are initially determined in step a), with adjacent measurement points belonging to a connected component not exceeding a maximum point distance. In this case a structural element of the structure type circular segment can be extracted particularly easily and efficiently from a connected component as follows:

Firstly, a circle is calculated on which are arranged the edge measurement points located at the respective ends of the connected component as well as a measurement point between the edge measurement points of the connected component, in particular essentially in the center between the edge measurement points. If the minimum distance of each measurement point of the connected component to the circle is less than a predefined threshold value, the measurement points of the connected component are assigned to the calculated circle, and otherwise the connected component is subdivided into two connected components at the measurement point of the connected component having the greatest minimum distance from the circle.

By means of simple geometric considerations the above method yields in a short time suitable circular segments which can be processed as structural elements.

In a particularly preferred embodiment variant of the method according to the invention, the measurement noise of the sensor is also taken into account in steps b) and c) by means of appropriate statistical methods, thereby increasing the precision of the determination of the egomotion of the object. Said measurement noise is preferably incorporated in the form of a covariance matrix as well as of the corresponding Mahalanobis distance, these variables being sufficiently known to the person skilled in the art. The first transformation sequence of step b) is in this case determined in particular by means of an iteration as follows:

In a step b.i) the Mahalanobis distances of the transformations, each of which maps the structural elements of a structural element pair onto one another, said Mahalanobis distances being dependent on an instantaneous covariance matrix, are calculated for a set of structural element pairs, each of which comprises a structural element of a transformed second data set and a structural element of the first data set, wherein a structural element pair is selected taking into account the Mahalanobis distances and a transformation for mapping the structural elements of the selected structural element pair onto one another is performed, a new, transformed second data set being obtained as a result.

In a step b.ii) at least the selected structural element pair is deleted from the set of structural element pairs, the covariance is updated and a return is made to step b.i).

In the above iterative method, when the transformations are selected in step b.i), in particular transformations having small Mahalanobis distances and/or transformations between long structural elements and/or accumulations of transformations are preferred.

In a preferred embodiment variant of the invention the transformation performed in step b.i) is estimated, in particular based on the Kalman filter. The updating of the covariance matrix in step b.ii) is performed particularly efficiently likewise through the use of the Kalman filter, the Kalman filter update formula being used for the re-estimation of the covariance matrix.

Preferably the structural element pairs deleted from the set of structural elements in step b.ii) also include such structural element pairs whose structural elements are mapped onto one another by means of a transformation whose Mahalanobis distance dependent on the updated covariance matrix is greater than a predefined threshold value.

In another embodiment of the method according to the invention, at the start of the iteration for determining the first transformation sequence the transformed second data set corresponds to the second data set obtained in step a) and the set of structural element pairs contains all possible pairs which include a structural element of the first data set and of the second data set or, as the case may be, a preselection of structural element pairs, the preselection including such structural element pairs whose structural elements are mapped onto one another by means of a transformation whose Mahalanobis distance dependent on an initial covariance matrix is less than or equal to a predefined threshold value. In a particularly preferred embodiment variant the initial covariance matrix is in this case determined based on the measurement noise of an odometric measurement or from a motion model.

In another embodiment of the method according to the invention the second transformation sequence of step c) is determined by means of an iteration as follows:

In a step c.i), for a set of structural element/measurement point pairs, each of which comprises a structural element of a transformed third data set and an unassignable measurement point of the first data set, the covariance-matrix-dependent Mahalanobis distances of the transformations which in each case map the structural element onto the unassignable measurement point of a structural element/measurement point pair are calculated, and a structural element/measurement point pair is selected taking into account the Mahalanobis distances and a transformation of the structural element onto the measurement point of the selected structural element/measurement point pair is performed, a new, transformed third data set being obtained as a result.

In a step c.ii) at least the selected structural element/measurement point pair is deleted from the set of structural element/measurement point pairs, the covariance matrix is updated and a return is made to step c.i).

In the selection of the transformations in step c.i) in the above iterative method, in particular transformations having small Mahalanobis distances and/or accumulations of similar transformations are preferred. In a preferred embodiment variant of the invention the transformation performed in step c.i) is estimated, in particular based on the Kalman filter. The updating of the covariance matrix in turn can also be performed with the aid of the Kalman filter.

In a preferred variant of the iterative method, in step c.ii) structural element/measurement point pairs in which the structural element is mapped onto an unassignable measurement point by means of a transformation whose Mahalanobis distance dependent on the updated covariance matrix is greater than a predefined threshold value are also deleted from the set of structural element/measurement point pairs.

In another variant of the method according to the invention, at the start of the iteration for determining the second transformation sequence the transformed third data set corresponds to the third data set obtained in step b) and the set of structural element/measurement point pairs contains all possible pairs which include a structural element of the third data set and an unassignable measurement point of the first data set, or a preselection of structural element/measurement point pairs, the preselection comprising such structural element/measurement point pairs in which the structural element is mapped onto an unassignable measurement point by means of a transformation whose Mahalanobis distance dependent on the current covariance matrix is less than or equal to a predefined threshold value.

In a preferred variant the method according to the invention further includes, after performance of step c), also a search for associations of still remaining unassignable measurement points, as a result of which an even more precise determination of the mapping of the data sets onto one another is achieved. In this case the remaining unassignable measurement points are contained in the above-defined fourth data set and said measurement points are associated with the unassignable measurement points of the first data set, insofar as suitable associations are found. Based on the associations, a third transformation sequence (which where appropriate can include only a single transformation or, if no associations are present, a null transformation without change of location) is then performed for mapping the unassignable measurement points of the fourth data set onto the unassignable measurement points of the first data set, a fifth data set being obtained as a result, the movement of the object between the first and second points in time being determined based on the first and second and third transformation sequence.

In the above-described variant of the method according to the invention, in particular an iteration comprising the following steps is performed for the purpose of determining the third transformation sequence:

In a step i) the covariance-matrix-dependent Mahalanobis distances of the transformations which map the unassignable measurement points of a measurement point pair onto one another are calculated for a set of measurement point pairs, each of which comprises an unassignable measurement point of a transformed fifth data set and an unassignable measurement point of the first data set, and a measurement point pair is selected taking into account the Mahalanobis distances and a transformation is performed for the purpose of mapping the measurement points of the selected measurement point pair onto one another, a new, transformed fifth data set being obtained as a result.

In a step ii) at least the selected measurement point pair is deleted from the set of measurement point pairs, the covariance matrix is updated and a return is made to step i). In the selection of the transformations in the above step i), in particular transformations having small Mahalanobis distances and/or accumulations of similar transformations are preferred.

In the above determination of the fifth data set, the measurement noise of the sensor is preferably taken into account in turn with the aid of statistical methods. In a preferred embodiment variant of the invention the transformation performed in step i) is estimated, in particular based on the Kalman filter. Preferably the covariance matrix is also updated in turn by means of the Kalman filter.

In another variant of the method according to the invention sensor data in the form of laser scans that has been acquired by means of a laser scanner disposed on the object is processed. A preferred field of application of the method according to the invention is the determination of the movement of a robot and/or a crane and/or a vehicle, in particular for the purpose of the autonomous navigation of such objects.

In addition to the above-described method the invention also comprises a device for the computer-aided calculation of the movement of an object from sensor data of a sensor disposed on the object, wherein the sensor data contains measurement point sets acquired at different point in time and consisting of measurement points from the environment of the object, wherein the device has a means for determining the movement of the object between a first measurement point set acquired at a first point in time and a second measurement point set acquired at a second point in time. Said means is embodied in such a way that the above-described method according to the invention is performed during the operation of the device.

The invention additionally relates to a computer program product having a program code stored on a machine-readable medium for the purpose of performing the above-described method according to the invention when the program executes on a computer.

BRIEF DESCRIPTION OF THE DRAWINGS

Exemplary embodiments of the invention are described in detail below with reference to the attached figures, in which.

DETAILED DESCRIPTION OF INVENTION

In the embodiments of the method according to the invention that are described here, consideration is given to sensor data in the fond of two-dimensional points that were acquired as what are termed laser scans by means of a laser scanner. In this case the individual points in the scans are produced as a result of the reflections of the laser beam moving during the scan from the objects in the environment of the object on which the laser scanner is disposed. The aim of the method described herein below is to determine the egomotion of the object by transforming laser scans acquired at different points in time onto one another and thereby determining the movement of the object between said points in time.

In order to be able to compare two different laser scans with each other at all, in the embodiment variant of the method according to the invention described here, structural elements in the form of lines and circles are ascertained from the individual measurement points of the respective scan. In order to extract said structural elements, connected components in the form of point sequences are initially ascertained, and subsequently corresponding structural elements are determined from the connected components.

The method of the invention is characterized in that in the transformation of two scans onto one another, not just the extracted structural elements but also unassignable measurement points, i.e. measurement points with which no structural element can be associated, are processed. Accordingly, hybrid scans comprising structural elements and measurement points are processed, the elements in such a hybrid scan being characterized in the embodiment variant described here by means of the set of points P, lines L and circles C. Thus, for a scan S comprising elements $e_i$ the following applies:

$$S=\{e_i | e_i \in \{P, L, C\}\}_{i=1, \ldots, n}$$

Figure 1:
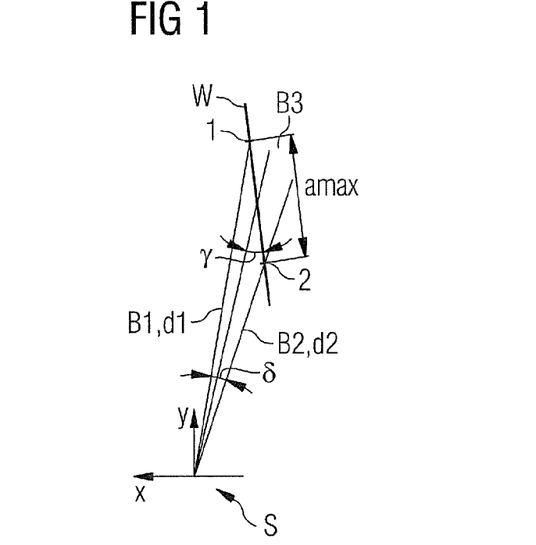
FIG. 1 is a schematic representation illustrating the extraction of connected components according to an inventive embodiment variant of the method.

As already mentioned above, connected pieces of measurement points must first be determined in the scan in order to extract lines and circles. In this case FIG. 1 illustrates a corresponding algorithm for subdividing the scan into connected pieces with the aid of measurement points which are arranged along a wall W. Connected ranges of measurement points are in this case characterized by means of a maximum point distance such that measurement points belong to a connected component only when their distance is less than or equal to the maximum point distance. In FIG. 1 the maximum point distance between two points 1 and 2 on the wall W is designated by amax. The sensor system S having the axes x and y acquires the points 1 and 2 via the adjacent beams B1 and B2. The distance a between adjacent measurement points on the wall W is obtained according to the law of sines from the angular distance $$\frac{\delta}{2}$$

between the left-hand beam B1 or, as the case may be, the right-hand beam B2 and the hypothetical center beam B3, indicated by a dashed line in FIG. 1, and the angle γ between said center beam and the wall W as well as from the two distances, measured by means of the sensor system S, from the origin of the sensor system to point 1 (designated as $d_1$) and from the origin of the sensor system S to point 2 (designated as $d_2$).

In particular the following applies:

$$a = (d_1 + d_2) \cdot \frac{\sin\left(\frac{\delta}{2}\right)}{|\sin(\gamma)|}$$

The angle γ between center beam B3 and the wall W is chosen as a parameter and by this means an upper limit value amax for the distance between adjacent points on the wall is obtained for every adjacent point pair.

With the aid of the distance amax, connected components are then extracted based on the following method:

Initially the first measurement point of the scan is arranged in the first, current connected component. The current connected component is extended by the next point when the distance between the last point of the connected component and the next point is less than or equal to the maximum distance amax. If, however, the next point has a distance greater than the maximum distance amax to the last point, the next point is assigned to a new, then current connected component. Unassigned measurement points remain in the scan and are not discarded. Connected components that contain less than a minimum number of individual points are deleted again and sorted back into the scan as unassignable measurement points.

After all of the connected components have been ascertained the geometric features are finally extracted in the form of lines and circles from the individual connected components. In this case an attempt is made to approximate each of the connected components on the one hand by lines and on the other hand by circles. Furthermore, other elements, such as e.g. right-angled corners, can also be extracted from the scan. The extraction of lines from a scan is sufficiently known to the person skilled in the art and is described for example in publication [1]. In the embodiment variant described here, lines are initially extracted from the scan by means of a widely established method. A recursive extraction of circles is then performed, said extraction being explained below with reference to FIG. 2.

Figure 2:
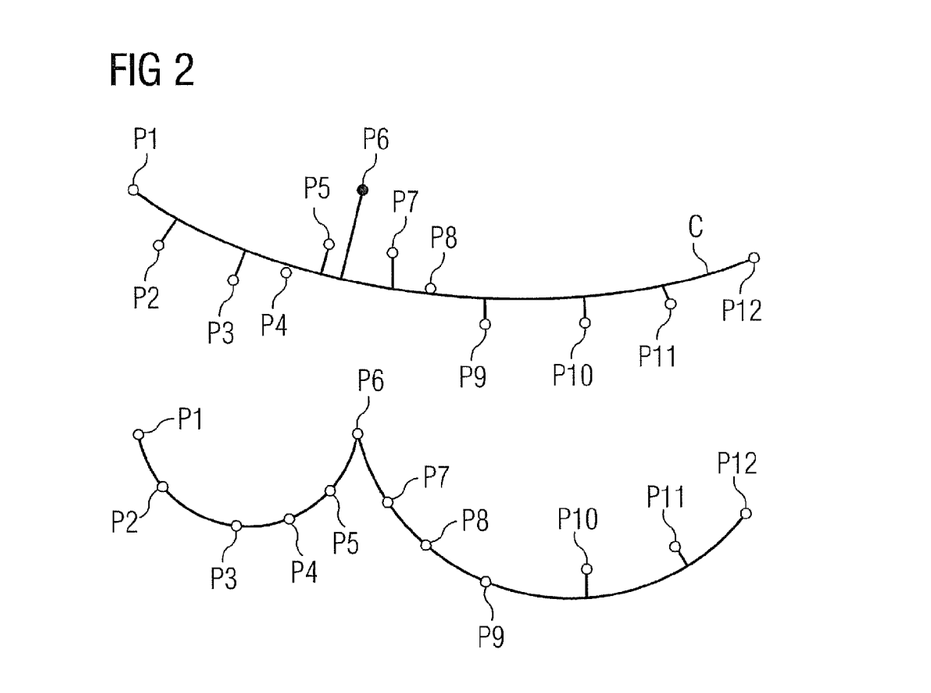
FIG. 2 is a schematic representation showing the extraction of circles according to an inventive embodiment variant of the method.

FIG. 2 shows in the upper part of the diagram a connected component consisting of measurement points P1, P2, . . . , P12. In order to extract circles or segments of circles from said set of points, the respective connected components are decomposed into circles, wherein in the event that a connected component under consideration becomes too short, i.e. if its number of points is less than a threshold value, the measurement points of said component are sorted back into the scan once again. In order to extract circles from the connected component of FIG. 2, the edge points P1 and P12 as well as a center point P8 of the connected component are considered first. A circle whose circumference runs through all three points can be clearly determined from said three points. Said determination takes place through the respective connecting of the edge points P1 and P12 to the center point P8 via a straight line and the determining of the midperpendicular of the respective straight line, the point of intersection of the midperpendicular being the center point of the circle.

Accordingly, a circle is initially obtained having the corresponding circular curve C on which the points P1, P8 and P12 lie. The radius r and the center point $c=(c_x, c_y)$ of said circle are known. In a next step the square of the distance of each point of the connected component from the circle is then calculated, i.e. the following distance is calculated:

$$d(p,c,r)^2 = (\sqrt{(p_x - c_x)^2 + (p_y - c_y)^2} - r)^2$$

where $p_x$ and $p_y$ designate the x and y coordinate, respectively, of the respective point of the connected component. If all distances of the points of the connected component are now less than a predefined threshold value, the segment is classified as a circular segment.

In the embodiment variant shown in FIG. 2 the individual distances d(p, c, r) are indicated as vertical connecting lines between the points and the circular curve, the distance between point P6 and the circular curve in this example exceeding the predefined threshold value, which is indicated by point P6 being depicted as solid black. Thus, the connected component cannot be classified as a circle, and for this reason in a next step the connected component is subdivided at the point of maximum distance, i.e. at point P6 in FIG. 2. This is indicated in the lower part of FIG. 2, with two connected components now being present. In this case the first connected component consists of points P1 to P6 and the second connected component consists of points P6 to P12. A procedure analogous to that described above is now followed for each connected component, i.e. a corresponding circle is determined based on the edge points P1 and P6 as well as the center point P3 of the first connected component and a circle is determined based on the edge points P6 and P12 and the center point P9 of the second connected component. In the example shown in FIG. 2 the distances of the individual points from the circular curve are less than the predefined threshold value for both connected components, such that the two segments are classified as circles.

The above-described algorithm tends toward over oversegmentation, i.e. instead of one arc of a circle two abutting circle arcs having roughly the same center points and radius are found. These can subsequently be combined again. Exactly as with the line extraction, center points and radius of the circle can subsequently be estimated precisely in accordance with the connected component, for example by determining the following minimum:

$$(c \ r) = \mathrm{argmin} \sum_{p \in Z} d(p, c, r)^2$$

where Z denotes the set of points of the connected component. In this case optimization methods known from the prior art, such as the Newton method, the quasi-Newton method or conjugate gradients, are used for finding the minimum.

If points in a scan appear both in an extracted line and in an extracted circular segment, the conflict in the overlapping region between lines and circle segment is resolved on the basis of the length of the individual segments and the sum total of the respective deviations in the overlapping region. A longer segment (measured by the number of points) is preferred in this case.

After a hybrid scan, i.e. a scan having extracted lines, circles and unassignable measurement points, has been obtained, a scan-matching algorithm is finally executed in order to map the structural elements and measurement points of two scans onto one another. Said scan-matching algorithm is initially described generally with reference to FIG. 3 to FIG. 7 and there then follows a detailed explanation of the algorithm and the mathematical methods used therein.

Figure 3:
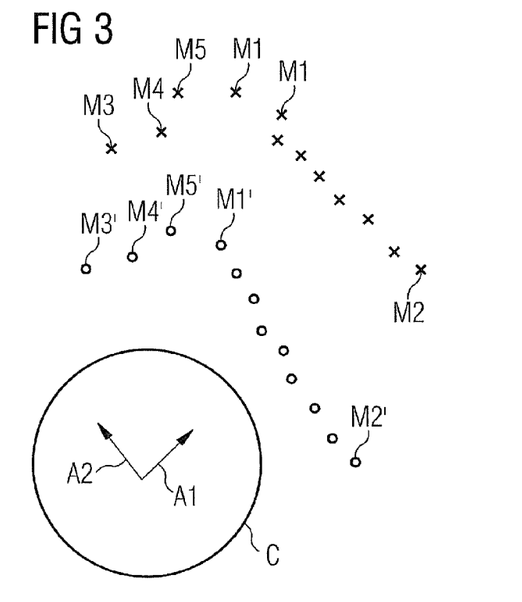
FIG. 3 to FIG. 7 are schematic representations depicting the sequence flow of the inventive method for associating structural elements and measurement points according to an inventive embodiment variant of the method.

FIG. 3 shows a first scan, which is also referred to as a reference scan and is indicated by means of points in the form of crosses, with some of the points being labeled by reference signs M1 to M5. Also depicted is a second scan which is indicated by means of points in the form of circles, with some of the points being labeled by reference signs M1' to M5'. The aim is now to determine a transformation by means of which the points of the second scan are mapped onto the reference scan. In this case the scans are mapped onto one another taking into account the measurement noise of the sensor, thereby reducing the probability of a misinterpretation of corresponding associations of points and structural elements between the individual scans.

In the embodiment variant described here the transformation which maps the two scans onto one another is determined step by step by ascertaining individual transformations of a transformation sequence, wherein the measurement noise is taken into account in the form of the motion covariance matrix of the individual transformations of the transformation sequence. In this case a transformation is described by means of a vector which as x and y component contains the translation in accordance with the transformation and as a further component includes the rotation of the transformation in the form of an angle β. The covariance matrix can be determined for such a transformation, with the components of the transformation being considered as random variables and each entry in the covariance matrix describing the covariances of the corresponding entries. The covariance is in this case defined as the expected value from the product of the difference between a first random variable and its expected value and the difference between a second random variable and its expected value. In this case the measurement noise of the sensor based on the covariances is taken into account in the embodiment variant described here based on the known Mahalanobis distance, which is explained in more detail further below.

In FIG. 3 to FIG. 7 the position of the sensor system is shown as the origin of the two axes A1 and A2. The current motion covariance or, as the case may be, the corresponding Mahalanobis distance is indicated by means of circles or, as the case may be, ellipses. By this means the probability of a movement based on the measurement noise is depicted. In the case of an ellipse a movement in the direction of the semi-minor axis is thus less probable than in the direction of the semi-major axis. In the case of a circle all movement directions are equally probable.

At the start of the method an initial covariance matrix is first specified which is determined, for example, from odometric data, i.e. from the movement of the wheels of the object on which the scanner is disposed. In the example shown in FIG. 3 every transformation is equally probable for the initial covariance matrix, with the result that the motion covariance is shown as a circle C. Initially the above-described extraction of structural elements is performed in the scans according to FIG. 3. In this case a line is extracted for each scan, which line in the reference scan comprises the scan points M1 and M2 and all points lying therebetween and in the second scan comprises the points M1' and M2' and all points lying therebetween.

Figure 4:
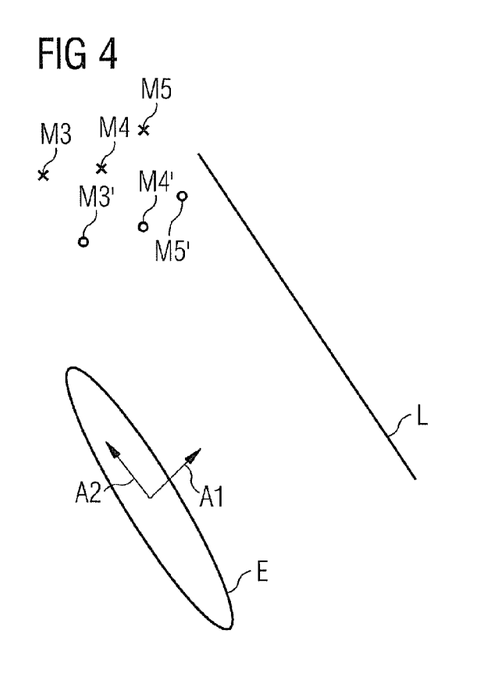
Figure 5:
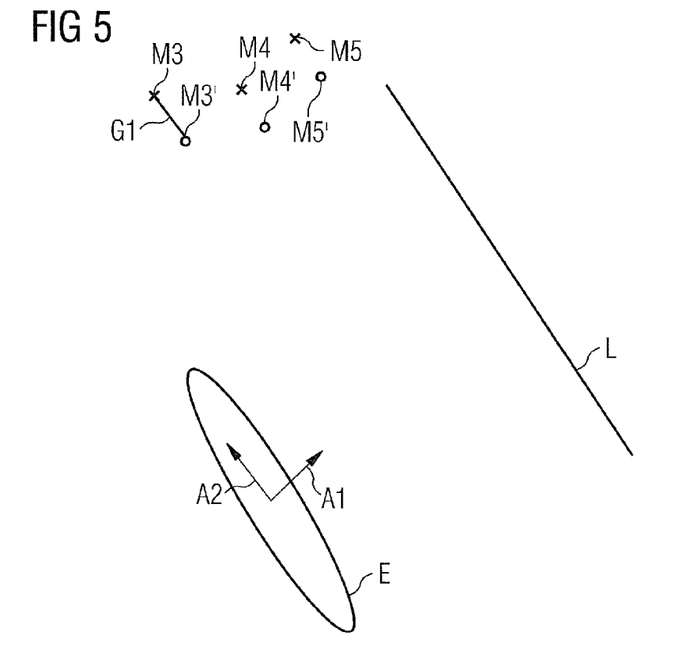

Following this, circles, if such are present, are also extracted in addition to the lines. There are no circles in the example according to FIG. 3 and only three further measurement points M3, M4 and M5 which are assignable to no structural element are present for the reference scan, and M3', M4' and M5' for the second scan. After this extraction the extracted lines of the two scans are associated with one another. In this case the motion covariance and the Mahalanobis distance of the transformation of the lines onto one another are taken into account. In the example according to FIG. 3 there is precisely one line per scan, the lines lying relative to one another in such a way that the transformation which maps the lines onto one another is highly compatible with the motion covariance, i.e. the corresponding transformation has a small Mahalanobis distance. The second scan for mapping the lines onto one another is moved accordingly, as illustrated in FIG. 4. Following the transformation the covariance matrix is updated, the Kalman filter known from the prior art being used for this purpose.

As can be seen from FIG. 4, all movements are now no longer equally probable, as illustrated by the corresponding ellipse E. In particular movements in the direction of the axis A1 are more improbable than in the direction of the axis A2, i.e. greater Mahalanobis distances result in the direction of the axis A1 than in the direction of the axis A2. Also apparent in FIG. 4 are the extracted lines L that are mapped onto one another as well as the unassignable measurement points M3 to M5 of the reference scan and M3' to M5' of the second scan.

There now takes place in a next step the search for associations of the unassignable measurement points M3' to M5' with the line L. Since a further movement in the direction of the axis A1 is very improbable due to the very great Mahalanobis distance, no association between the unassignable measurement points and the line L is accepted by the algorithm. For this reason, in a next step, an association of the unassignable measurement points of the respective scans with one another is now performed in the algorithm. As is apparent from FIG. 4, in this case the most favorable direction of the transformation is the direction along the axis A2. In order to ascertain the association between the measurement points the possible transformations between point pairs are considered once again and, based on the Mahalanobis distance of the transformations, the points M3 and M3' are associated with one another and mapped onto one another by means of a first transformation, said transformation being indicated in FIG. 5 by means of a corresponding straight line G1. After the transformation has been performed the covariance matrix is updated once more.

Figure 6:
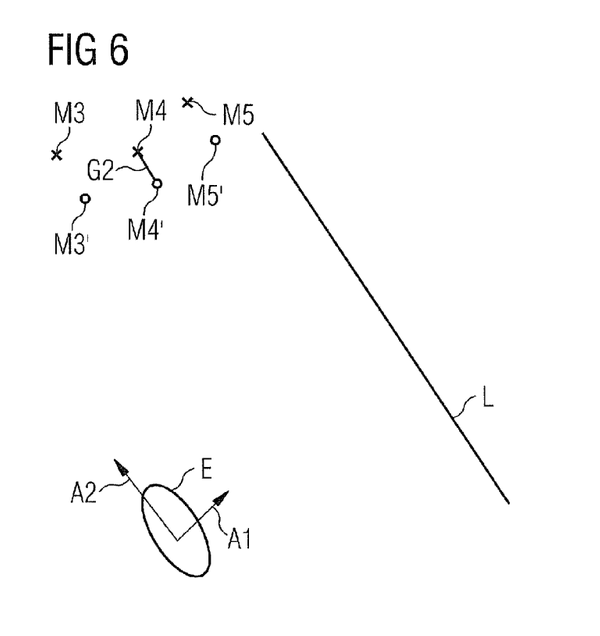
Figure 7:
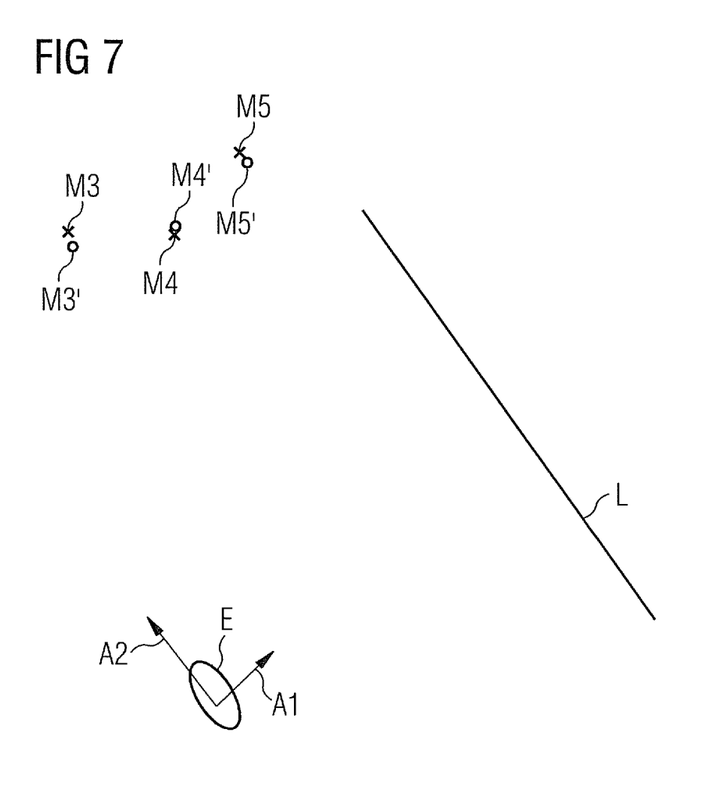

Finally, the point-to-point association is repeated for further point pairs, wherein as the next step the measurement points M4 and M4' are associated with one another, as indicated by means of the straight line G2 in FIG. 6. After a corresponding transformation has been performed a smaller covariance matrix is produced, as can be seen from a corresponding reduction in size of the ellipse E in FIG. 6 compared with the ellipse E in FIG. 5. Finally, a corresponding transformation is performed through association of the measurement points M5' and M5 with one another, with the result that overall, after performance of the individual transformations of the point pairs, a transformation sequence is produced which maps the two scans very accurately onto one another, as can be seen from FIG. 7. In this case the covariance matrix is small enough to enable the scan match to be considered as correct with a sufficient degree of certainty.

Finally, the egomotion of the object is derived from the overall transformation of all previously performed transformations for mapping a line onto a line and the measurement points onto one another.

The individual steps of a scan matching algorithm for mapping two hybrid scans are explained in detail below.

A scan $S=\{e_1, \ldots e_n\}$ consisting of points or, as the case may be, structural elements $e_1$ to $e_n$, e.g. a previously recorded reference scan S', is considered as fixed and another, in particular the current scan $S_0^\alpha$, as moving. In this case the elements can be points, straight lines or circular segments. At the same time, after the scan matching algorithm is invoked, an initial covariance $\Sigma_0$ of the probability distribution is passed to the configuration of the $T_k=(x_0 \ y_0 \ \beta_0)^T=(0 \ 0 \ 0)^T$ of the moving scan.

In a next step the lines are first compared with one another in the hybrid scans. If there are no lines in one of the scans, the process continues by comparing lines with points or, as the case may be, by comparing circular segments, assuming circular segments are contained in the hybrid scans.

For the purpose of comparing lines with lines, a set of transformations $\{T_{i,j} | T_{i,j}(L_i^a) \text{ kollinear } L_j^r\}$ is determined per line pair $(L_i^a, L_j^r)$, $L_i^a \in S_k^a$, $L_j^r \in S^r$. Clearly these are the transformations which align the moving line parallel to the reference line in the reference scan and then shift it onto the latter. In the domain of the transformations this set itself again forms a straight line. The Mahalanobis distance $$\|(x \ y \ \beta)\|_P^2 = (x \ y \ \beta) \cdot \Sigma^{-1} \cdot \begin{pmatrix} x \\ y \\ \beta \end{pmatrix}$$

dependent on the instantaneous motion covariance $\Sigma$ is assigned to each transformation $T=(x \ y \ \beta)^T$.

For a line pair, this Mahalanobis distance contains the displacement along the line as parameter.

From the possible transformations between lines, one transformation is now selected, and as a result the assigned line pair. The following criteria are used for this:
  transformations between long lines are more valuable than between short ones;
  transformations having a small noun are good;
  clusters of transformations are good.

Based on these criteria, different strategies can be derived. In a variant of the invention the transformation between the longest line having a sufficiently small norm is selected. This minimizes the risk of incorrect associations.

In a next step the scan is shifted and rotated by means of the transformation $T_{k+1}$, resulting in the following new scan:

$$S_{k+1}^a = T_{k+1}(S_k^a)$$

In the embodiment variant described here the transformation is determined by means of an estimation method. In this case the estimated transformation represents a special variant of the transformations or transformation sequences which are performed or executed as claimed in the claims. The estimation method is explained below with reference to an example in which a line $L_i^a$ of the current scan is shifted onto a line $L_j^r$ of the reference scan and rotated. The position of the end points of the line should not be used for estimating the transformation because it is very uncertain. The lines are therefore parameterized in accordance with the straight line on which they lie, based on the length and direction of the perpendicular onto said straight line, the so-called Hessian normal form $$L \sim \begin{pmatrix} d \\ \varphi \end{pmatrix}.$$

The derivation of this representation from the scan points belonging to the line is described in publication [2]. This representation is regarded as a "measurement" within the meaning of the Kalman mechanism.

The covariance of such a line is also determined from the covariance of the scan points in publication [2]. Said determination is used hereinbelow for ascertaining the covariances of the reference line $\Sigma_r$ and the moving line $\Sigma_a$.

The state to be estimated within the meaning of the Kalman filter is the transformation between current scan and reference scan. Thus, $$L_i^a \sim \begin{pmatrix} d_i^a \\ \varphi_i^a \end{pmatrix}$$

takes on the role of the prediction and $$L_j^r \sim \begin{pmatrix} d_j^r \\ \varphi_j^r \end{pmatrix}$$

is used as the "measurement". The covariance of the prediction is made up of the covariance of the line extraction $\Sigma_a$ and the previous covariance of the transformation.

As a result of the transformation $T_{(x \ y \ \beta)}$ of the object the prediction $$\begin{pmatrix} d \\ \varphi \end{pmatrix}$$

is converted into $$\begin{pmatrix} d + x \cdot \cos(\varphi) + y \cdot \sin(\varphi) \\ \varphi + \beta \end{pmatrix} = g\left(T_{(x \ y \ \beta)}, \begin{pmatrix} d \\ \varphi \end{pmatrix}\right).$$

The Jacobian thereof is $$G = \begin{pmatrix} \cos(\varphi) & \sin(\varphi) & 0 \\ 0 & 0 & 1 \end{pmatrix}.$$

The covariance of the prediction results from the motion covariance $\Sigma_G = G \cdot \Sigma_k \cdot G^T$. To this is added the covariance $\Sigma_a$ from the measurement uncertainty.

Thus, the Kalman filter gain is calculated as $K_k = \Sigma_k \cdot G^T \cdot (G \cdot \Sigma_k \cdot G^T + \Sigma_a + \Sigma_r)^{-1}$.

The transformation from this landmark association is calculated as $$T_{k+1} = T_k + K_k \cdot \left( \begin{pmatrix} d_j^r \\ \varphi_j^r \end{pmatrix} - \begin{pmatrix} d_i^a \\ \varphi_i^a \end{pmatrix} \right).$$

The motion covariance $\Sigma_{k+1}$ is likewise re-estimated according to the Kalman filter update formula, and furthermore as follows: $\Sigma_{k+1} = (\mathrm{Id} - K_k \cdot G) \cdot \Sigma_k$.

The preceding current scan is transformed with the aid of the just determined transformation $T_{k+1}$ and the resulting scan becomes the new preceding scan, i.e. the following applies:

$$S_{k+1}{}^a = T_{k+1}(S_k{}^a).$$

If there are pairs of straight lines that have not yet been taken into account, $k \leftarrow k+1$ is set and a return is made to the above step, in which a line pair is selected based on the Mahalanobis distance. In this case the line pair just taken into account is no longer considered.

After the comparison of the lines has been completed, circles are compared with circles in the hybrid scan, and finally measurement points with lines. The comparison of circles with circles proceeds analogously to the comparison of lines with lines, for which reason the method will not be described again here. In the comparison of measurement points with lines the possible transformations which move a measurement point on a line form a two-dimensional manifold. Based on practical considerations, a suitable preselection is always made; in the embodiment variant described here the preselection is determined based on the probabilistic norm with the instantaneously valid covariance, i.e. based on:

$$\|( x_k \quad y_k \quad \beta_k )\|_P^2 = ( x_k \quad y_k \quad \beta_k ) \cdot \sum_k{}^{-1} \cdot \begin{pmatrix} x_k \\ y_k \\ \beta_k \end{pmatrix}$$

The new covariance is obtained analogously to the preceding case from the covariance of the line, the covariance of the measurement point and the function which maps the pair consisting of measurement point and line onto the chosen transformation.

The point-line pairs are in turn processed successively, with implausible pairings, i.e. pairings with Mahalanobis distances above a threshold value, being omitted.

Finally, measurement point pairs are also dealt with, and furthermore analogously to the line pairs or, as the case may be, the point-line pairs.

In conclusion a transformation sequence is thus obtained by means of which the mapping of the hybrid scans onto one another is described and from which the egomotion of the object can be determined.

The embodiment variant of the method according to the invention that has just been described has a number of advantages. The uncertainty of an erroneous assignment is reduced thanks to the successive use of the possible associations of structural elements or, as the case may be, points, sorted according to the risk of an incorrect association. Measurement uncertainties are taken into account statistically in a suitable manner through the use of the Kalman filter within a scan match. Instead of the Kalman filter, other descriptions of uncertainty can also be used, for example sample-based descriptions, such as e.g. on particle filters. Where appropriate the method can also be embodied in such a way that the motion uncertainty is taken into account by means of weighted measures for the association of structural elements or, as the case may be, points.

LIST OF REFERENCES

[1] Jens-Steffen Gutmann: "Robuste Navigation autonomer mobiler Systeme" ("Robust navigation of autonomous mobile systems"), Dissertation, 2000, Albrecht-Ludwig-Universität Freiburg

[2] Michael. Bosse: "ATLAS: A Framework for Large Scale Automated Mapping and Localization", Dissertation, MASSACHUSETTS INSTITUTE OF TECHNOLOGY, pages 57 to 62, February 2004

The invention claimed is:

1. A method for a computer-aided calculation of a movement of an object using sensor data of a sensor disposed on the object, wherein the sensor data contain measurement point sets acquired at different points in time and measurement points from an environment of the object, an object movement between a first measurement point set acquired at a first point in time and a second measurement point set acquired at a second point in time being determined as follows:
   a) extracting structural elements of one or more structure types from the first measurement point set and the second measurement point set using a computer resulting in
      a first data set based upon the first measurement point set comprising extracted structural elements, and
      a second data set based upon the second measurement point set comprising extracted structural elements, and
      unassigned measurement points which cannot be assigned to any structural element;
   b) associating the extracted structural elements of a same structure type of the first data set with the second data set using the computer, and performing a first transformation sequence for mapping the extracted structural elements of the second data set onto the structural elements of the first data set based upon the same structure type using the computer;
   c) associating the extracted structural elements of the same structure type of the first transformation sequence with the unassigned measurement points using the computer, and performing a second transformation sequence for mapping the extracted structural elements of the same structure type of the first transformation sequence onto the unassigned measurement points using the computer; and
   d) determining a movement of the object between the first point in time and the second point in time based upon the first transformation sequence and the second transformation sequence,
   wherein in steps b) and c) a measurement noise of the sensor is taken into account, and wherein the first transformation sequence of step b) is determined by an iteration, comprising:

b.i) for a set of structural element pairs, each of which comprises a structural element of a transformed second data set and a structural element of the first data set, calculating Mahalanobis distances of the transformations, each of which maps the structural elements of a structural element pair onto one another, the Mahalanobis distances being dependent on an instantaneous covariance matrix, selecting a structural element pair based upon the Mahalanobis distances, and performing a transformation for mapping the structural elements of the selected structural pair onto one another, wherein a new, transformed second data set is obtained as a result; and b.ii) deleting at least the selected structural element pair from the set of structural element pairs, updating the covariance matrix, and returning to step b.i), wherein in a selection of the transformations in step b.i), transformations with small Mahalanobis distances and/or transformations between long structural elements and/or accumulations of similar transformations are preferred, and wherein the transformation performed in step b.i) is estimated based on a Kalman Filter, and/or in step b.ii) the covariance matrix is updated with a Kalman filter.

2. The method as claimed in claim 1, wherein the extracted structural elements are at least of the type line.

3. The method as claimed in claim 2, wherein in step b) structural elements of the type line are extracted first.

4. The method as claimed in claim 2, wherein the extracted structural elements also include the structure type circular segment.

5. The method as claimed in claim 2, wherein in step a) connected components comprising succeeding measurement points are determined first, wherein adjacent measurement points belonging to a connected component do not exceed a maximum point distance.

6. The method as claimed in claim 5, wherein a structural element of the structure type circular segment is extracted from a connected component as follows:

calculating a circle on which are arranged edge measurement points located at respective ends of the connected component and a measurement point between the edge measurement points of the connected component, in particular essentially in the center between the edge measurement points; and when a minimum distance of each measurement point of the connected component to the circle is less than a predefined threshold value, the measurement points of the connected component are assigned to the calculated circle, and otherwise the connected component is subdivided into two connected components at the measurement point of the connected component having a greatest minimum distance from the circle.

7. The method as claimed in 1, wherein in step b.ii) structural element pairs whose structural elements are mapped onto one another by a transformation whose Mahalanobis distance dependent on the updated covariance matrix is greater than a predefined threshold value is also deleted from the set of structural elements.

8. The method as claimed in claim 1, wherein, at a start of the iteration for determining the first transformation sequence, the transformed second data set corresponds to the second data set obtained in step a) and the set of structural element pairs contains all possible pairs which include a structural element of the first data set and of the second data set, or a preselection of structural element pairs, the preselection including such structural element pairs whose structural elements are mapped onto one another by a transformation whose Mahalanobis distance dependent on an initial covariance matrix is less than or equal to a predefined threshold value, wherein the initial covariance matrix is determined based on a measurement noise of an odometric measurement and/or from a motion model.

9. The method as claimed in claim 1, wherein the second transformation sequence of step c) is determined by an iteration, comprising:

c.i) for a set of structural element/measurement point pairs, each of which comprises a structural element of a transformed third data set and an unassigned measurement point of the first data set, calculating the covariance-matrix-dependent Mahalanobis distances of the transformations, each of which maps the structural element onto the unassigned measurement point of a structural element/measurement point pair, selecting a structural element/measurement point pair based upon the Mahalanobis distances, and performing a transformation for mapping the structural element onto the measurement point of the selected structural element/measurement point pair and obtaining a new, transformed third data set as a result; and c.ii) deleting at least the selected structural element/measurement point pair whose transformation was selected in step c.i) from the set of structural element/measurement point pairs, updating the covariance matrix, and returning to step c.i).

10. The method as claimed in claim 9, wherein in the selecting of the transformations in step b.i), transformations with small Mahalanobis distances and/or accumulations of similar transformations are preferred, and wherein the transformation performed in step c.i) is estimated based on the Kalman filter, and/or in step c.ii) the covariance matrix is updated with the Kalman filter.

11. The method as claimed in claim 9, wherein in step c.ii) structural element/measurement point pairs in which the structural element is mapped onto an unassigned measurement point by a transformation whose Mahalanobis distance dependent on the updated covariance matrix is greater than a predefined threshold value are also deleted from the set of structural element/measurement point pairs.

12. The method as claimed in claim 9, wherein at a start of the iteration for determining the second transformation sequence, the transformed third data set corresponds to the third data set obtained in step b) and the set of structural element/measurement point pairs contains all possible pairs which comprise a structural element of the third data set and an unassigned measurement point of the first data set, or a preselection of structural element/measurement point pairs, wherein the preselection includes such structural element/measurement point pairs in which the structural element is mapped onto an unassigned measurement point by a transformation whose Mahalanobis distance dependent on the current covariance matrix is less than or equal to a predefined threshold value.

13. A device for the computer-aided calculation of the movement of an object using sensor data of a sensor disposed on the object,
   wherein the sensor data contain measurement point sets acquired at different points in time and consisting of measurement points from the environment of the object,
   wherein the device determines an object movement between a first measurement point set acquired at a first point in time and a second measurement point set acquired at a second point in time by performing a method as claimed in claim 1.

14. The method as claimed in claim 1, wherein, after step c) has been performed,
   a search is conducted for associations of the remaining unassigned measurement points of the fourth data set with the unassigned measurement points of the first data set and
   a third transformation sequence is performed based on the associations found for the purpose of mapping the unassigned measurement points of the fourth data set onto the unassigned measurement points of the first data set, a fifth data set being obtained as a result,
   wherein the movement of the object between the first and second point in time is determined based on the first and second and third transformation sequence, and
   wherein a measurement noise of the sensor is taken into account in a determination of the fifth data set.

15. The method as claimed in claim 14, wherein the third transformation sequence is determined by means of an iteration, comprising:
   i) for a set of measurement point pairs, each of which comprises an unassigned measurement point of a transformed fifth data set and an unassigned measurement point of the first data set, calculating the covariance-matrix-dependent Mahalanobis distances of the transformations which map the unassigned measurement points of a measurement point pair onto one another,
   selecting a measurement point pair based upon the Mahalanobis distances, and
   performing a transformation for the purpose of mapping the measurement points of the selected measurement point pair onto one another obtaining a new, transformed fifth data set as a result;
   ii) deleting at least the selected measurement point pair from the set of measurement point pairs,
   updating the covariance matrix, and
   returning to step i).

16. The method as claimed in claim 15, wherein in the selecting of the transformations in step i), transformations with small Mahalanobis distances and/or accumulations of similar transformations are preferred.

17. The method as claimed in claim 15, wherein the transformation performed in step i) is estimated based upon the Kalman filter, and/or in step ii) the covariance matrix is updated with the Kalman filter.

18. The method as claimed in claim 1, wherein the sensor disposed on the object is a laser scanner and the sensor data represents laser scans.

19. The method as claimed in claim 1, wherein the method is used for determining the movement of a robot and/or a crane and/or a vehicle.

* * * * *